United States Patent
Lee

(10) Patent No.: US 7,990,476 B2
(45) Date of Patent: Aug. 2, 2011

(54) SYSTEM AND METHOD FOR DETECTING VISUAL OCCLUSION BASED ON MOTION VECTOR DENSITY

(75) Inventor: Sangkeun Lee, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 958 days.

(21) Appl. No.: 11/858,014

(22) Filed: Sep. 19, 2007

(65) Prior Publication Data

US 2009/0074311 A1    Mar. 19, 2009

(51) Int. Cl.
H04N 5/14    (2006.01)

(52) U.S. Cl. .......................... 348/699; 382/103

(58) Field of Classification Search .............. 348/699
See application file for complete search history.

(56) References Cited

U.S. PATENT DOCUMENTS

| | | | | |
|---|---|---|---|---|
| 5,394,196 A * | 2/1995 | Robert | ............. | 348/699 |
| 5,436,674 A * | 7/1995 | Hirabayashi et al. | ......... | 348/699 |
| 6,005,639 A * | 12/1999 | Thomas et al. | ............... | 348/699 |
| 6,008,865 A * | 12/1999 | Fogel | ............. | 348/700 |
| 6,011,596 A * | 1/2000 | Burl et al. | ............. | 348/699 |
| 6,219,436 B1 * | 4/2001 | De Haan et al. | ............. | 382/107 |
| 6,480,632 B2 * | 11/2002 | Martins et al. | ............. | 382/300 |
| 6,625,333 B1 * | 9/2003 | Wang et al. | ............. | 382/300 |
| 7,519,230 B2 * | 4/2009 | Wittebrood et al. | ............. | 382/236 |
| 7,536,031 B2 * | 5/2009 | Wittebrood | ............. | 382/107 |
| 2002/0154695 A1 * | 10/2002 | Cornog et al. | ............. | 375/240.16 |
| 2004/0252763 A1 * | 12/2004 | Mertens | ............. | 375/240.16 |
| 2005/0105000 A1 * | 5/2005 | Mertens | ............. | 348/441 |
| 2005/0129124 A1 * | 6/2005 | Ha | ............. | 375/240.16 |
| 2005/0141614 A1 * | 6/2005 | Braspenning et al. | ... | 375/240.16 |
| 2005/0163355 A1 * | 7/2005 | Mertens | ............. | 382/128 |
| 2006/0072790 A1 * | 4/2006 | Wittebrood et al. | ............. | 382/107 |
| 2007/0002058 A1 * | 1/2007 | Wittebrood | ............. | 345/475 |
| 2008/0095399 A1 * | 4/2008 | Cui et al. | ............. | 382/103 |
| 2008/0317289 A1 * | 12/2008 | Oyaizu | ............. | 382/107 |
| 2009/0060041 A1 * | 3/2009 | Lertrattanapanich et al. | ............. | 375/240.16 |
| 2009/0074311 A1 * | 3/2009 | Lee | ............. | 382/236 |

* cited by examiner

Primary Examiner — Sath V Perungavoor

(57) ABSTRACT

A method of processing image data, comprising providing image data configured to display a first frame comprising a plurality of blocks, each block having a motion vector indicative of a change of location of the block between the first frame and a successive second frame and determining a change in state of occlusion of a first block of the plurality of blocks by reference to motion vectors having a destination in the first block.

23 Claims, 5 Drawing Sheets

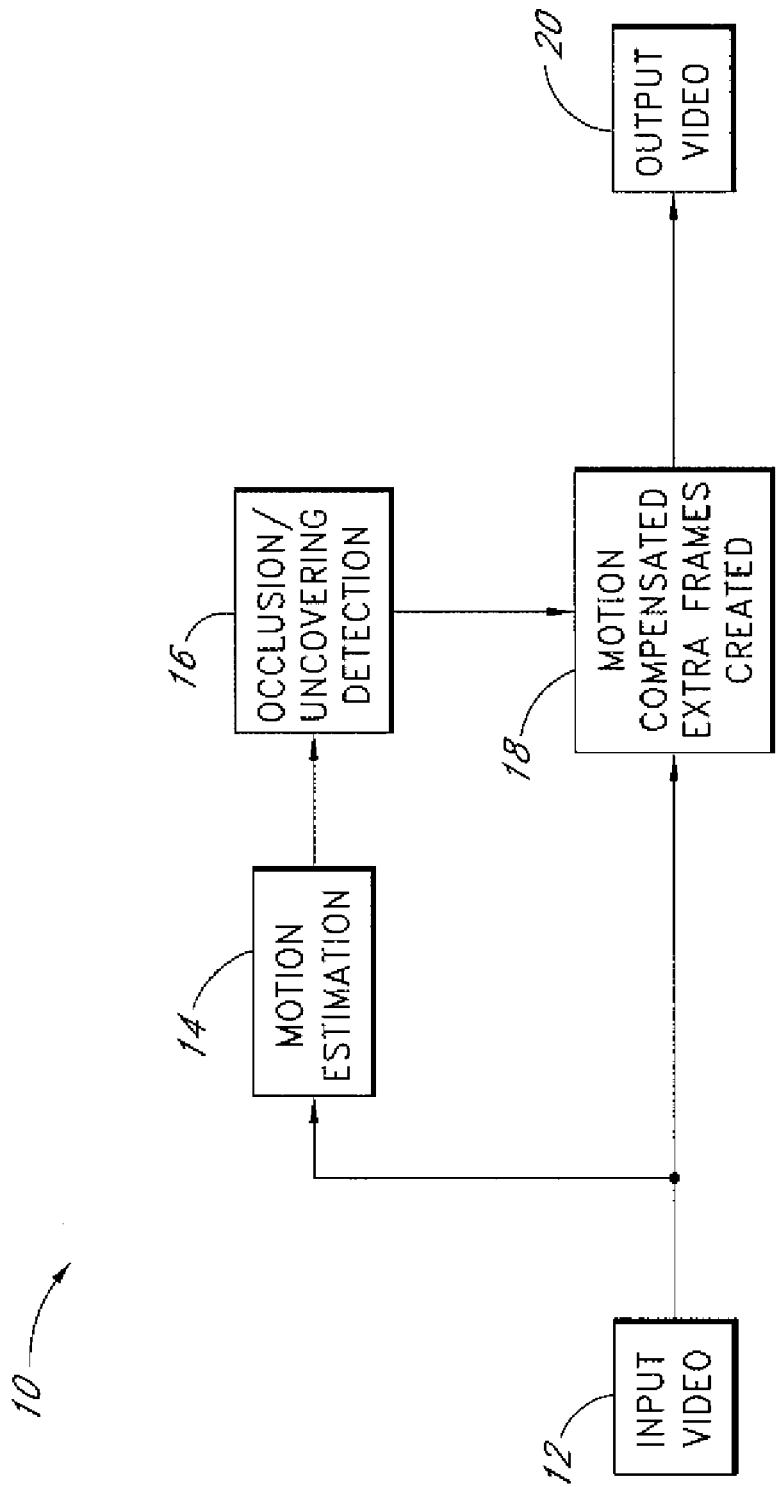

SYSTEM AND METHOD FOR DETECTING VISUAL OCCLUSION BASED ON MOTION VECTOR DENSITY

BACKGROUND

This disclosure relates to image processing and specifically to detection of occlusion during frame rate-up conversion.

Discussion of Related Technology

During image processing, it is sometimes desirable to increase the frame rate of video images. Thus, during processing, it can be necessary to create new frames to insert between existing frames, without changing the overall time length of the video or the timing of the existing frames.

Video images can be broken into blocks of pixels, and examination of changing locations of the blocks of pixels during successive frames can yield motion vectors. To convert video information between different formats, it is sometimes necessary to remove video frames or insert additional frames between existing frames, know as frame rate-up conversion. To insert a frame during frame rate-up conversion, the location of pixel blocks at an intermediary location between two existing frames is interpolated. Because objects in the video may move in foreground, middle ground, and background positions, between successive frames, some objects in the middle ground or background can move behind objects in the foreground, resulting in occlusion from view of the rearward object. Similarly, portions of the background can become uncovered and thus be viewable when foreground objects move away from those locations. When inserting a frame, it is necessary to detect which pixel blocks correspond to occluded objects to address boundary interactions. Accordingly, a method of detecting occlusion or uncovering is needed to allow interpolation for frame creation.

SUMMARY

One aspect of the development includes a method of processing image data comprising providing image data defining a first frame comprising a plurality of blocks, each block having a motion vector indicative of a destination location in a second frame; determining the number (N) of motion vectors indicative of a destination location within a distance of a target location in the second frame; and determining a change in state of occlusion of the target location based on N.

BRIEF DESCRIPTION OF THE DRAWINGS

FIG. 1 is a block diagram illustrating a system configured to process video information.

DETAILED DESCRIPTION OF EMBODIMENTS

Figure 2B:
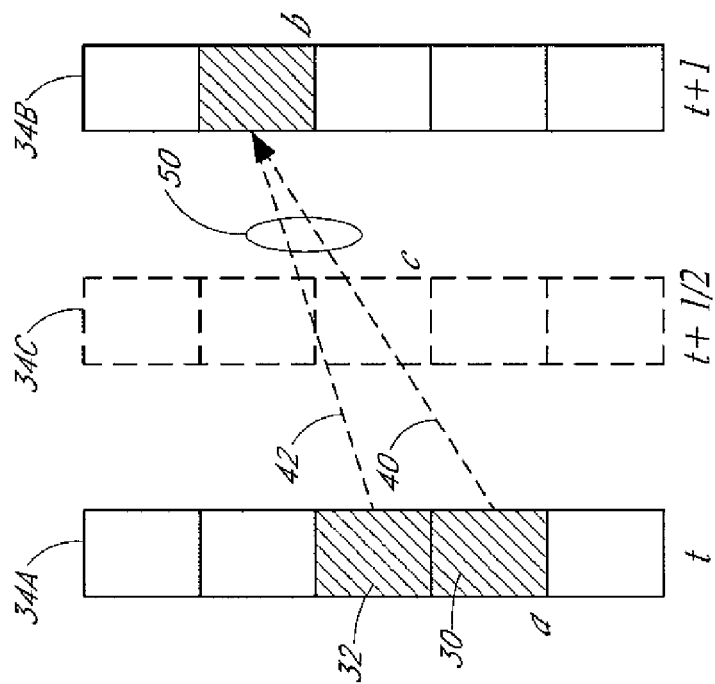
FIG. 2B schematically illustrates sequence of FIG. 2A with an inserted video frame.

FIG. 1 illustrates an embodiment of a video system 10 comprising several components. The system 10 can be used to perform frame rate conversion. Input video 12 can be provided to a motion estimation component 14, wherein the video frames can be rendered as pixel blocks. Each block can be composed of a single pixel, or a larger number of pixels. In some embodiments, blocks can be geometrically square. In other embodiments, blocks can include pixels configured in a rectangular shape. In still other embodiments, the pixel blocks can have other geometric shapes. The number of pixels in a block can range from one to hundreds, or thousands. The motion estimation component 14 is responsible for generally detecting whether a block of pixels has stayed substantial the same, but changed location in the frame. One embodiment of the processing performed by the motion estimation component involves the definition of motion vectors. A motion vector defines the movement of a block from one location in a first frame to another (possibly collocated) location in a second frame. The motion estimation component 14 is further connected to an occlusion/uncovering detection unit 16, which detects if two or more blocks have moved such that one is in front of the other, or one has moved from behind the other. The input video 12 and the results of the occlusion/uncovering detection unit 16 are used to create motion compensated extra frames 18 which are interleaved appropriately to create output video 20 having a frame rate different than the input video.

Figure 2A:
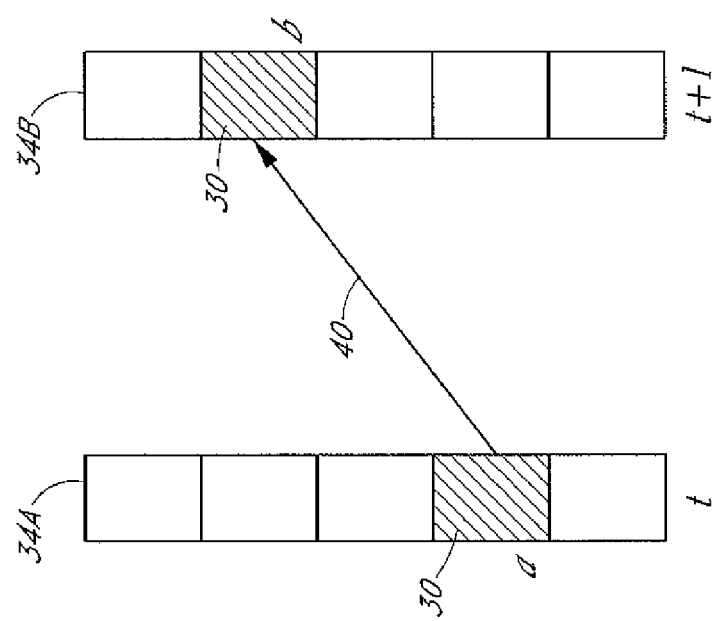
FIG. 2A schematically illustrates a sequence of video frames.

With reference now to FIGS. 2A and 2B, the locations of pixel blocks in a first frame can change to different locations in successive frames of a video. In the embodiment illustrated in FIGS. 2A and 2B, a series of video frames 34 are depicted, each having five vertical pixel blocks for illustrative purposes. In other embodiments, the frames 34 can have more or fewer blocks, and can be wider or narrower than the illustrated frames 34. In the first frame 34A in FIG. 2A, at time t, a pixel block 30 is located in location a. At time t+1, the block 30 can be located at a different position b in the next frame 34B. A motion vector may be calculated by the motion estimation component 14 to determine the location of the block 30 in the next frame 34B. The motion vector 40 can contain information allowing the location of the block 30 at time t+1 to be determined based upon its location at time t. Thus, a block 30 at a location a in the frame 34A at time t will have a location b in the frame 34B at time t+1. When the motion vector 40 is provided along with the location a of the pixel block 30 at time t, it is possible to calculate the position b that the block 30 will occupy in the frame 34B at time t+1.

As shown in FIG. 2B, during frame rate-up conversion, a new frame 34C can be interposed at a time between t and t+1. The presence of new frame 34C results in a greater number of frames to be processed over the same time period for the video segment. Accordingly, the frame rate of the video segment must be increased in order to convert video information between different display formats. Additionally, although the time t+½ is used here for the inserted frame position, other time intervals can be used. Preferably, the frames to be introduced are inserted in even time intervals, thus two frames can be inserted at t+⅓ and t+⅔. Three frames can be inserted at t+¼, t+½, and t+¾, and so on.

During some conversions, multiple blocks can have the same destination location. The circumstance is illustrated in FIG. 2B, wherein two blocks 30, 32 can have motion vectors 40, 42 with a common destination location b in frame 34B. Occlusion can occur when, as illustrated in FIG. 2b, more than one block has a motion vector indicative of the same destination location. Such occlusion can require additional processing to reduce or remove video artifacts from degrading image quality near the site of the occlusion. Accordingly, the motion vectors can be examined to determine if occlusion is likely to occur. An increase in motion vector density, determined by the number of vectors arriving in a location or its vicinity can be indicative of occlusion.

As seen in FIG. 2B, a window 50 which includes motion vectors 40 and 42 within its boundaries can be selected for evaluation. The window 50 represents an evaluation of the destination location b and neighboring locations to determine an increase or decrease in the actual number of motion vectors having destination locations within the window as compared to the number of possible destination locations. The window 50 is schematically illustrated to designate a location where the density of motion vectors can be seen to be increasing or decreasing. The motion vectors 40, 42 passing through the window 50 are not parallel, as would be expected for two objects that are stationary relative to each other. Instead, the motion vectors 40, 42 are angled towards each other, as they both indicate the movement of an object into location b. Thus, occlusion of one of the objects is to be expected in the resulting frame.

"The outer boundary of the window 50 represents a group of destination locations having a central destination location of interest. To determine whether uncovering, occlusion, or neither is taking place at a particular location between successive frames, the window 50 is selected to encompass the particular location and neighboring location blocks, such as neighboring location blocks within a distance of the particular location and the distance being greater than zero. The number of neighboring location blocks can vary as desired, but preferably they surround the central destination location. As shown in the embodiment illustrated in FIGS. 4A and 4B, eight surrounding destination locations 85, forming a square around the central destination location X, can be used to define a window 50. Other window configurations are possible, including different geometric shapes. The representation of density of motion vectors passing through the window 50 is calculated by determining if the number of vectors of arriving within the central destination location X and the neighboring destination locations. The window 50 can then be repositioned to have a new destination location at the center, and the calculations performed again for the new central destination location and its neighboring destination locations. Each pixel in the frame can thus be examined, iteratively, between successive frames. As a result, discovery of locations of occlusion and uncovering taking place between successive frames can be achieved."

Figure 3:
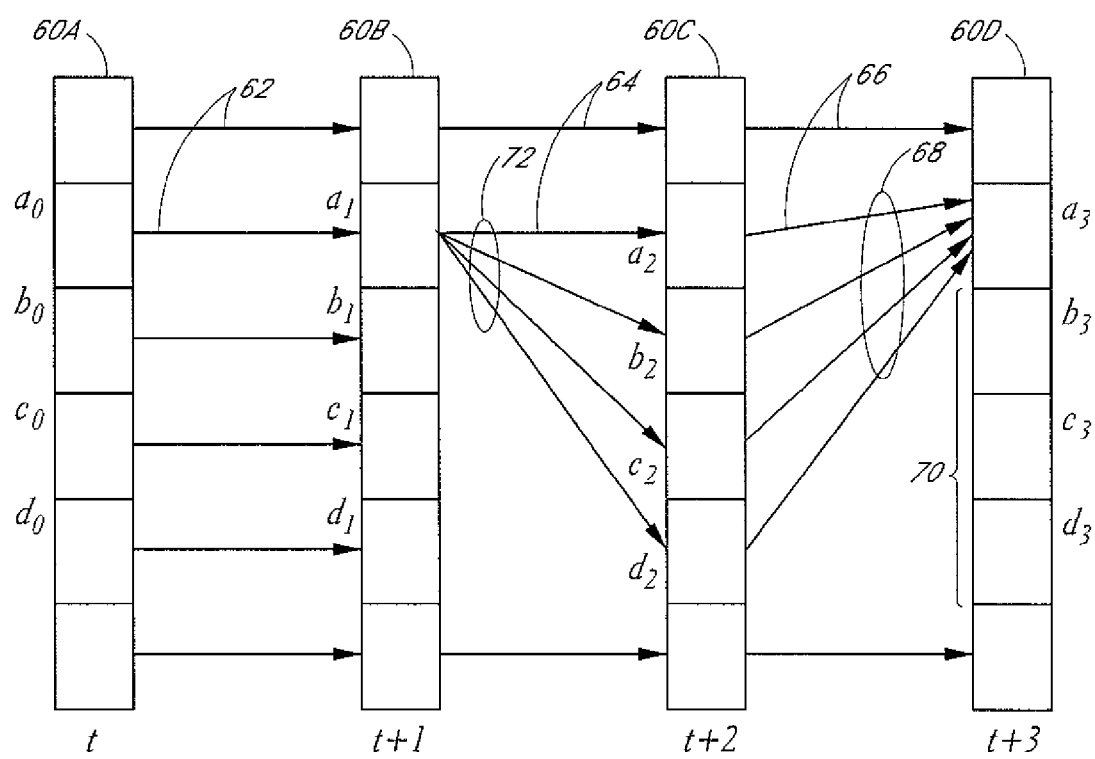
FIG. 3 schematically illustrates a sequence of video frames.

With reference to FIG. 3, frames 60 are displayed at four time intervals t through t+3. As described above, the frames 60 can have more or fewer blocks than those illustrated, and can have different shapes, including a wider shape. Between frames 60A and 60B, no pixel blocks change from locations a-d, as can be seen by examination of the motion vectors 62. Between frames 60B and 60C, however, an object from location $a_1$ expands to several locations, $a_2$-$d_2$. When such an expansion takes place, the blocks previously present in locations $b_1$-$d_1$ are hidden, or occluded, by the new blocks.

When advancing from frame 60C to frame 60D, however, the objects in blocks $b_2$-$d_2$ have a single destination location, $a_e$. The concentration of motion vectors 66 can be seen as increasing near destination location $a_3$, as illustrated by their passage through the window 68. Blocks $b_3$-$d_3$, having been vacated by the object occupying them in frame 60C, can be considered to be experiencing uncovering, as opposed to occlusion. The uncovered region 70, in the illustrated embodiment, is not the destination of any other motion vectors. Accordingly, the pixel blocks in those locations in frame 60B, specifically the blocks in locations $b_1$-$d_1$, are now displayed again in the video. Inspection of the window 68 can indicate an instance of occlusion. Similarly, inspecting a window near the uncovered region 70 and detecting a reduced number of motion vectors 66 can indicate an instance of uncovering.

The video sequence can be evaluated moving either forward or backward. In some embodiments, such as those where frame rate conversion is being performed on video images through a reverse sequence, evaluation of the origin of motion vectors, as shown by the window 72 between frames 60B and 60C can provide indications of occlusion or uncovering. As in the illustrated example, where a number of motion vectors 64 with origins within the window is greater than the number of destination locations $a_1$, $b_1$ encompassed by the window 72, uncovering can be said to be occurring. Where the number of motion vectors 64 is approximately equal to the number of blocks $a_1$, $b_1$, neither uncovering nor occlusion is taking place.

Figure 4A:
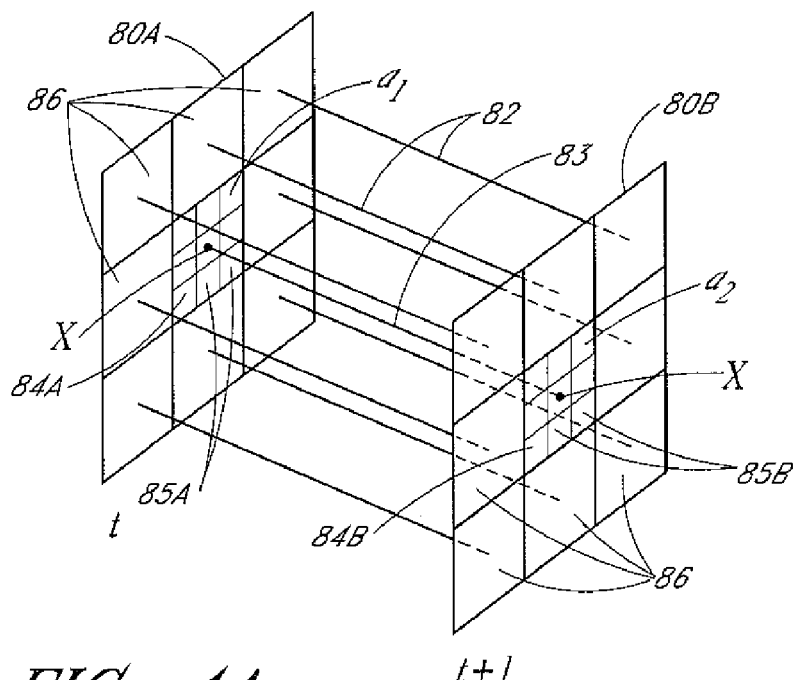
FIGS. 4A and 4B schematically illustrate sequences of video frames with motion vectors and pixel blocks displayed.
Figure 4B:
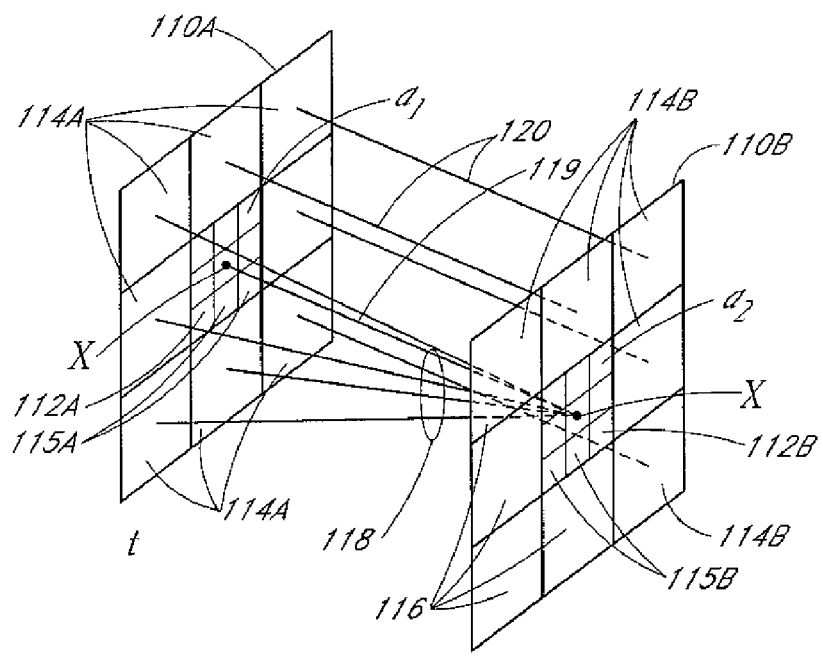

With further reference now to FIGS. 4A and 4B, portions of two sequential frames 80, 110 are displayed. As shown in FIG. 4A, a first group of pixel blocks 84A, having a central pixel block X, can occupy the central group of locations $a_1$ in the first frame 80A. The first group of pixel blocks 84A can have a motion vector 83 which is indicative of a destination location at the central group of locations $a_2$ of the second frame 80B. The destination location of the central pixel block X can be evaluated for occlusion uncovering, or neither by examining the number of motion vectors with a destination location the same as the destination location of the central pixel block X, as well as the number of motion vectors with destination locations in a number of immediately adjacent destination locations 85. As shown in FIG. 4A, in some embodiments, the eight immediately adjacent destination locations 85 surrounding the destination location of the central block X, and within the first group of pixel blocks 84A, are considered to determine the change in pixel block X in successive frames. In other embodiments, more or fewer adjacent destination locations can be considered, and the groups of destination locations can have a regular shape, such as the illustrated square, or an irregular shape.

The destination location of interest is preferably located towards the center of any group of destination locations being evaluated, but the destination location of interest does not have to be in the center of the group, and can be offset therefrom. In some embodiments, the destination location of interest can be on an edge of the group of destination locations, particularly when the edge of a video frame composed of several groups of destination locations is evaluated.

As shown in the illustrated embodiment, in some cases, the motion vectors 82 create neither occlusion nor uncovering. In the embodiments illustrated in FIGS. 4A and 4B, a single motion vector, such as 83 in FIG. 4A or 119 in FIG. 4B, is illustrated to indicate the motion of travel of a pixel block within the group of locations from which the vector originates. This example is also representative of all of the other motion vectors 82, 120. Accordingly, some motion vectors which would indicate the motion of travel of other pixel blocks within the same group of locations from which the vector originates have not been illustrated in FIGS. 4A and 4B for clarity of illustration. Groups of pixel blocks, however, typically have one motion vector associated with each pixel block within the group. Thus, for the embodiments illustrated in FIGS. 4A and 4B, each group of pixel blocks, whether it is the group comprised of the central pixel block X, and the pixel blocks 85A, 115A surrounding it, or a neighboring group of pixel blocks 86, 116, has nine motion vectors 82, 120 associated with each of the nine pixel blocks forming the group. In other embodiments, a group of pixel blocks can have more or fewer pixel blocks, with a corresponding higher or lower number of motion vectors. The surrounding groups of pixel blocks 86 can have motion vectors 82 which do not have a destination location in common with the destination location of first group of pixel blocks 84A. In such a case, neither covering nor uncovering can be said to occur.

By contrast, as shown in FIG. 4B, a first group of pixel blocks 112A, having a central pixel block X, can be surrounded by adjacent groups of pixel blocks 114A. Unlike FIG. 4A, however, some motion vectors 120 from some pixel blocks in the adjacent groups of pixel blocks can have a destination location in common with the destination location of the first group of pixel blocks, namely the central destination location marked 112B. In the illustrated embodiment, the destination location is the location of the central pixel block X however, the entire central destination location group 112B can be evaluated for calculating the number of motion vectors with destination locations within the group. Additionally, although only one motion vector 120 is illustrated having a destination location in the central destination location group 112B, which would indicate only one pixel block having such a destination, the motion vectors of other pixel blocks within the central destination location groupd 112B have been omitted for clarity, but should still be considered.

Because some of the surrounding groups of pixel blocks 114A can have pixel blocks with a destination location in the central destination location group 112B, an evaluation of the number of motion vectors 120 having a destination in the central destination location group 112B will result in a motion vector count higher than the number of destination locations in the central destination location group 112B. In the illustrated embodiment, only those motion vectors 120 of pixel blocks arriving in the central destination location groupd 112B are depicted for clarity. Other pixel blocks may have destination locations in the group destination locations 116. The concentration of motion vectors 120 can be seen by examining a window 118 containing motion vectors 120 arriving in the central destination location group 112B. In FIG. 4B, four pixel blocks' motion vectors 120 are illustrated where the pixel block has an original location in an adjacent group of pixel blocks 114A, and a destination location in the central destination location group 112B. Thus, together with the motion vectors of the nine pixel blocks in the first group, a total of 13 motion vectors are illustrated having a destination in the central destination location group 112B.

To determine an instance of occlusion, uncovering, or neither, the number of motion vectors having a destination in the central destination location group 112B can be compared with the number of destination locations in the central destination location group 112B. If the number of motion vectors with a destination location within a group is greater than a predetermined value, based on the number of destination locations within the group, occlusion can be said to be occurring. Similarly, if the number of motion vectors with destination locations in the central destination location group 112B is less than another predetermined value, also based on the number of destination locations, then uncovering can be said to be occurring. Finally, if the number of motion vectors with destination locations in the central destination location group 112B exceeds neither the upper threshold for occlusion nor the lower threshold for uncovering, it can be determined that neither is taking place.

In some embodiments, when the number of motion vectors with a destination location within a group exceeds the number of destination locations within the group by an upper threshold of at least 30%, this can be determinative of occlusion. In some embodiments, different values for the upper threshold can be used, including a threshold of 18% and increasing without bound. Preferably, a threshold between 20% and 35%, inclusive, is used. Likewise, a lower threshold can be 30% fewer motion vectors with a destination location within a group than the number of destination locations. Likewise, 18% fewer can indicate uncovering, with the threshold decreasing to the total number of destination locations within the group. Thus, as a bottom limit, if no motion vectors have a destination location within the group, uncovering can be said to be occurring.

The evaluation of a group or segment of destination locations for occlusion, uncovering, or neither can be repeated for each destination location in the group, and for each destination location in each of the surrounding groups, and each destination location in the image frame, until the status of each destination location in the frame is determined. The presence of occlusion, uncovering, or neither, can then be used during creation and insertion of frames during rate-up conversion to process each pixel block appropriately.

Figure 5:
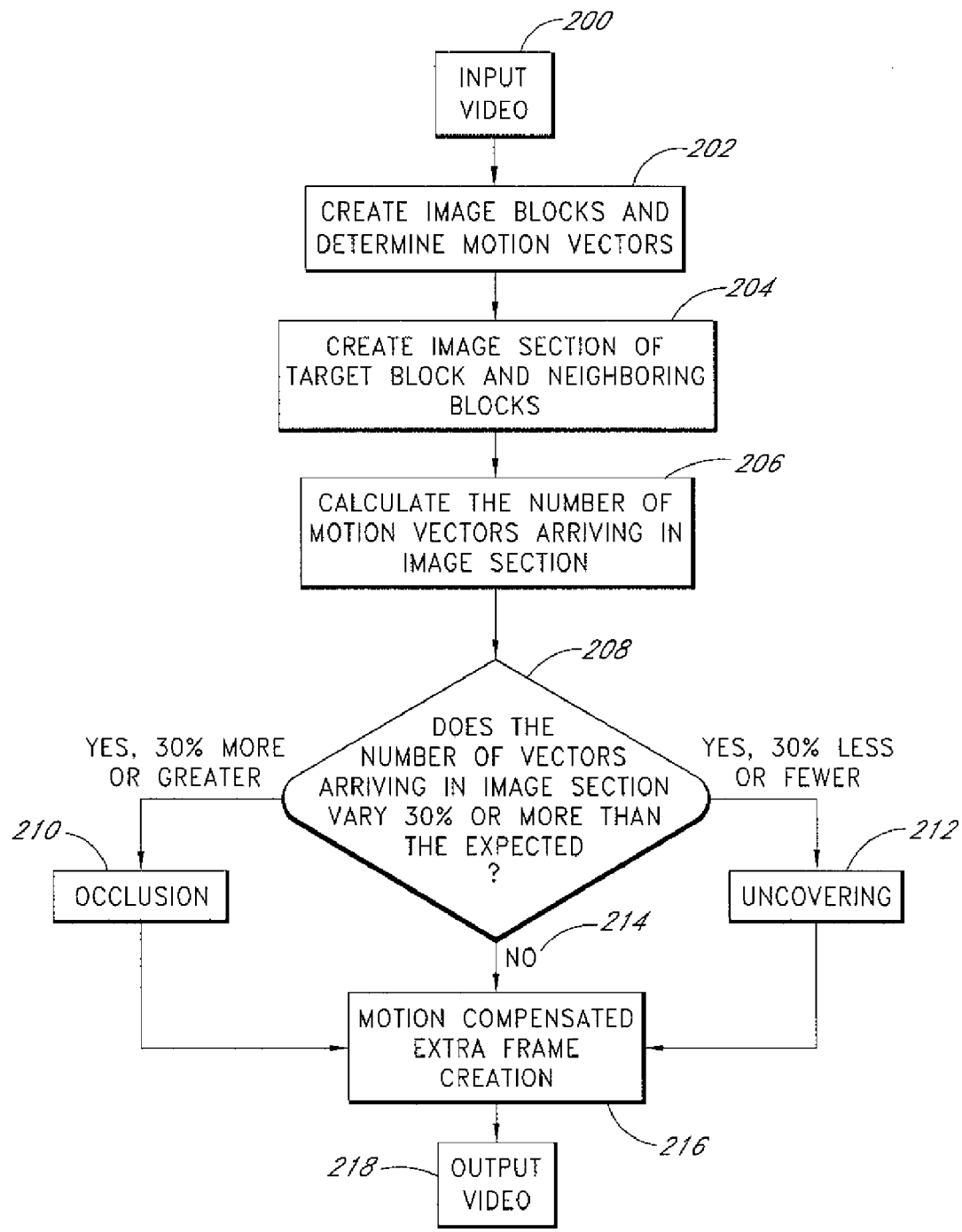
FIG. 5 is a flow diagram of an embodiment of a method of determining occlusion or uncovering of objects in video information.

FIG. 5 is a flow chart illustrating the processing of an input video in accordance with the disclosure herein to produce an output video modified to take into account occlusion and uncovering. At step 200, an input video is provided to step 202, where it is processed to create pixel blocks and to determine motion vectors. A subsequent step 204 of identifying a particular destination location for evaluation includes the determination of adjacent destination locations to form groups or segments of destination locations. At step 206, for each destination location, the number of motion vectors having a destination location within the group or segment containing the destination location is calculated. At step 208, this calculation is used to determine the motion vector density. This is done by comparing the number of motion vectors with a destination location within a group or segment with the number of destination locations in the group or segment. If it is determined that there are at least 30% more motion vectors with destination locations within a group than destination locations within the group, the process moves to step 210, wherein occlusion is indicated. If it is determined in step 208 that there are at least 30% fewer motion vectors with destination locations within a group than destination locations within the group the process moves to step 212, wherein uncovering is indicated. In step 208, if it is determined that the number of motion vectors with destination locations within the group varies less than 30% with respect to the number of destination locations within the group, then neither occlusion nor uncovering is identified. This process can be repeated for each destination location. Then, from steps 208, 210, or 212, the process moves to step 216 wherein the motion compensated extra frames are created. The input video combined with the additional frames produced in step 216 is provided as the output video in step 218, wherein the process is completed. As described above, although thresholds of an increase of 30% or more and a decrease of 30% or more are disclosed, other thresholds can be used as well.

The foregoing description sets forth various preferred embodiments and other exemplary but non-limiting embodiments of the inventions disclosed herein. The description gives some details regarding combinations and modes of the disclosed inventions. Other variations, combinations, modifications, modes, and/or applications of the disclosed features and aspects of the embodiments are also within the scope of this disclosure, including those that become apparent to those of skill in the art upon reading this specification. Thus, the scope of the inventions claimed herein should be determined only by a fair reading of the claims that follow.

What is claimed is:

1. A method of processing image data comprising:
providing image data defining a first frame comprising a plurality of blocks, each block having a motion vector indicative of a destination location in a second frame;
determining the number (N) of motion vectors indicative of a destination location within a distance of a target location in the second frame, the distance greater than zero; and
determining a change in state of occlusion of the target location based on N.

2. The method of claim 1, wherein determining the change in state of occlusion includes comparing N with a predetermined value.

3. The method of claim 1, further comprising determining the number (M) of possible destination locations within the distance of the target location in the second frame, wherein the determining the change in state of occlusion includes comparing N and M.

4. The method of claim 3, wherein comparing N and M comprises determining if N is at least 20% more than the M.

5. The method of claim 3, wherein comparing N and M comprises determining if N is at least 30% more than the number of blocks.

6. The method of claim 3, wherein comparing N and M comprises determining if the N is less than M.

7. The method of claim 3, wherein comparing N and M comprises determining if N is at most 20% less than M.

8. The method of claim 3, wherein comparing N and M comprises determining if N is at most 30% less than the M.

9. The method of claim 1, wherein the first frame is after a second, preceding frame of image data.

10. The method of claim 1, wherein the first frame occurs before the second frame.

11. The method of claim 1, additionally comprising the step of providing the change in state of occlusion of the target location to a processing component.

12. The method of claim 1, wherein determining the change in state of occlusion of the target location includes determining when N is greater than a predetermined value, the predetermined value is greater than one.

13. The method of claim 1, wherein determining the change in state of occlusion of the target location includes determining whether the motion vectors are angled towards each other.

14. The method of claim 1, further comprising:
creating a geometric window around the target location; and
wherein:
determining the change in state of occlusion of the target location includes determining whether the motion vectors are within the geometric window.

15. An image processing system comprising:
a motion estimation component configured to receive image information, and determine motion vector information based on the image information;
a state detection component configured to receive the motion vector information and determine state information based on the motion vector information including motion vector density information; and
a frame rate conversion component adapted to receive the image information and the state information, and to alter the image information based on the state information.

16. The image processing system of claim 15, wherein the image information is video.

17. The image processing system of claim 15, wherein the image information comprises image data defining a first frame comprising a plurality of blocks, the motion vector information comprises data defining a plurality of motion vectors, each motion vector associated with a block and indicative of a destination location in a second frame, and the determining of state information comprises determining the number of motion vectors indicative of a destination location with a distance of a target location in the second frame and comparing the number to a predetermined value.

18. The image processing system of claim 17, wherein the predetermined value is at least 18% more than the number of possible destination locations within the distance of the target location in the second frame.

19. The image processing system of claim 17, wherein the predetermined value is at least 30% more than the number of possible destination locations within the distance of the target location in the second frame.

20. The image processing system of claim 17, wherein the predetermined value is at most 18% less than the number of possible destination locations within the distance of the target location in the second frame.

21. The image processing system of claim 17, wherein the predetermined value is at most 30% less than the number of possible destination locations within the distance of the target location in the second frame.

22. An image processing system comprising:
means for providing image data defining a first frame comprising a plurality of blocks, each block having a motion vector indicative of a destination location in a second frame;
means for determining the number (N) of motion vectors indicative of a destination location within a distance of a target location in the second frame, the distance greater than zero; and
means for determining a change in state of occlusion of the target location based on N.

23. One or more processor-readable storage devices having processor-readable code embodied on the processor-readable storage device, the processor-readable code for programming one or more processors to perform a method for obtaining a transmit beamforming vector for transmission of high definition video data over a wireless medium, the method comprising:
providing image data defining a first frame comprising a plurality of blocks, each block having a motion vector indicative of a destination location in a second frame;
determining the number (N) of motion vectors indicative of a destination location within a distance of a target location in the second frame, the distance greater than zero; and
determining a change in state of occlusion of the target location based on N.

* * * * *